(12) United States Patent
Olaru

(10) Patent No.: US 7,252,498 B2
(45) Date of Patent: Aug. 7, 2007

(54) HOT RUNNER NOZZLE WITH MELT SEALING

(75) Inventor: George Olaru, Toronto (CA)

(73) Assignee: Mold-Masters Limited, Georgetown, Ontario (CA)

( * ) Notice: Subject to any disclaimer, the term of this patent is extended or adjusted under 35 U.S.C. 154(b) by 456 days.

(21) Appl. No.: 10/819,267

(22) Filed: Apr. 7, 2004

(65) Prior Publication Data

US 2004/0197437 A1   Oct. 7, 2004

Related U.S. Application Data

(60) Provisional application No. 60/468,973, filed on May 9, 2003, provisional application No. 60/460,418, filed on Apr. 7, 2003.

(51) Int. Cl.
*B29C 45/20* (2006.01)
(52) U.S. Cl. ............... 425/549; 264/328.15; 425/572; 425/588
(58) Field of Classification Search ............ 425/549, 425/572, 588; 264/328.15
See application file for complete search history.

(56) References Cited

U.S. PATENT DOCUMENTS

| 4,818,217 A | 4/1989 | Schmidt et al. |
| 4,836,766 A | 6/1989 | Gellert |
| 4,902,218 A | 2/1990 | Leonard et al. |
| 5,049,062 A | 9/1991 | Gellert |
| 5,052,100 A | 10/1991 | Trakas |
| 5,225,211 A | 7/1993 | Imaida et al. |
| 5,268,184 A | 12/1993 | Gellert |
| 5,269,677 A | 12/1993 | Gauler |
| 5,484,275 A * | 1/1996 | Kushnir ............... 425/190 |
| 5,609,893 A | 3/1997 | Eastwood |
| 5,792,493 A | 8/1998 | Gellert |
| 5,830,524 A * | 11/1998 | Braun ............... 425/549 |
| 5,879,727 A | 3/1999 | Puri |
| 2005/0196486 A1 | 9/2005 | Babin et al. |

FOREIGN PATENT DOCUMENTS

| DE | 7603206 U | 6/1976 |
| DE | 3501840 C2 | 7/1986 |
| DE | 100 08 722 A1 | 8/2001 |
| JP | 2005-41020 | 2/2005 |
| JP | 2005-132026 | 5/2005 |
| WO | WO 01/15884 | 3/2001 |

OTHER PUBLICATIONS

Schotti Heisskanal-Systeme Brochure, Oct. 1997.

* cited by examiner

*Primary Examiner*—Tim Heitbrink
(74) *Attorney, Agent, or Firm*—Medler Ferro PLLC

(57) ABSTRACT

A modular hot runner nozzle having a variable length includes a first nozzle portion and a second nozzle portion provided in series between a manifold and a mold gate of an injection molding apparatus. The first nozzle portion and the second nozzle portion having respective nozzle channels for delivering the melt stream from the manifold to a mold cavity. A nozzle tip is provided at a forward end of the hot runner nozzle. The nozzle tip and the manifold are generally fixed within the injection molding apparatus so that axial thermal expansion is taken up by a telescoping or a slidable connection that is provided between the first nozzle portion and the second nozzle portion.

23 Claims, 10 Drawing Sheets

HOT RUNNER NOZZLE WITH MELT SEALING

CROSS-REFERENCE TO RELATED APPLICATIONS

This application claims the benefit under 35 U.S.C. § 119(e) of provisional applications U.S. Appl. No. 60/460,418, filed Apr. 7, 2003 and U.S. Appl. No. 60/468,973, filed May 9, 2003, the disclosures of which are incorporated by reference herein in their entirety.

BACKGROUND OF THE INVENTION

1. Field of the Invention

The present invention relates generally to an injection molding apparatus and, in particular, to a hot runner nozzle with a variable length in operation.

2. Related Art

In a multi-cavity injection molding apparatus having a manifold for delivering a melt stream of moldable material to a plurality of nozzles, the heat distribution throughout the manifold is typically uneven. This uneven heat distribution causes the manifold to deflect. As a result, the distance between the lower surface of the manifold and each of a plurality of mold cavities varies and thus each nozzle is subjected to unique operating conditions depending on the nozzle location relative to the manifold. The nozzles also experience thermal expansion, however, the nozzles are generally fixed between the mold cavities and the manifold. As such, the thermal expansion results in a variable sealing force being applied to both the manifold and the mold gate which is not desirable since it will allow the pressurized melt to leak at the interface between the manifold and each nozzle, as well as at each gate around the nozzle seals if the manifold floats and is retained by only the head portion of each injection nozzle. Such leakage may also occur in nozzles threaded into the manifold, but only at the gate area.

What is needed is a hot runner nozzle that accommodates thermal expansion of a nozzle without causing a variable force to be applied between the nozzle and a manifold or a mold gate of an injection molding apparatus.

SUMMARY OF THE INVENTION

According to an embodiment of the present invention there is provided an injection molding apparatus that includes a manifold having a manifold channel for receiving a melt stream of moldable material under pressure. A nozzle having a first nozzle portion and a second nozzle portion is provided in series and positioned between the manifold and a mold gate, the first nozzle portion and the second nozzle portion having respective nozzle channels for delivering the melt stream from the manifold to a mold cavity. A nozzle tip is provided at a forward end of the second nozzle portion, the nozzle tip also having a generally fixed position relative to a mold plate. The present invention further includes a telescoping or slidable connection provided between the first nozzle portion and the second nozzle portion to allow for a continuous flow of melt therebetween, wherein thermal expansion during operation of the injection molding apparatus is accommodated by the telescoping connection. In addition, a biasing means is provided between the first and second nozzle portions to maintain contact between the first nozzle portion and the manifold and the second nozzle portion and the mold gate and to provide a preload in cold conditions. In this manner, the biasing means also accommodates for manufacturing tolerances. During operation, the biasing means absorbs the thermal expansion of the first and second nozzles while counteracting injection pressures to maintain the second nozzle portion in contact with the mold gate.

A nozzle in accordance with the present invention provides an advantage in that the nozzle body compensates for the thermal expansion of the injection molding system along its length without resulting in an additional load/force on another portion of the injection molding system. The invention also provides a solution for preventing leakage of the pressurized molten material at the interface between the manifold and each nozzle and around the nozzle seals at the mold gate area.

BRIEF DESCRIPTION OF THE FIGURES

Embodiments of the present invention will now be described more fully with reference to the accompanying drawings where like reference numbers indicate similar structure.

DETAILED DESCRIPTION OF THE INVENTION

Figure 8:
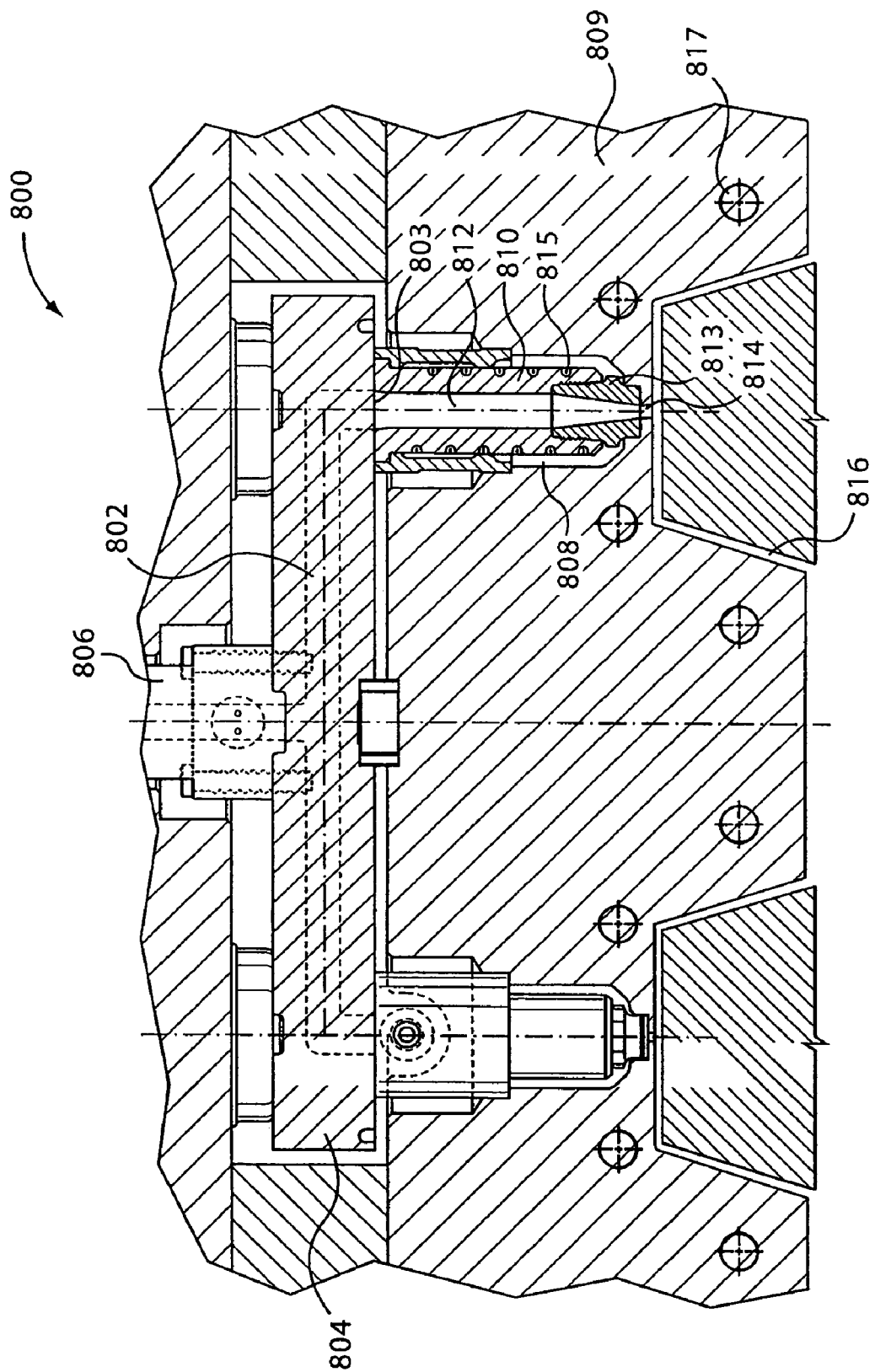
FIG. 8 illustrates a partial cross-sectional view of an injection molding apparatus in which the present invention is intended for use.

Referring first to FIG. 8, an injection molding apparatus 800 discloses an environment in which the present invention is intended for use. FIG. 8 is a partial cross-sectional view of injection molding system 800. A manifold melt channel 802 extends through a hot runner manifold 804 and is in fluid communication with a melt source from a machine nozzle (not shown) via a sprue bushing 806. A nozzle 810 is positioned within a nozzle cutout 808 of a cavity plate 809. A nozzle melt channel 812 of nozzle 810 is in fluid communication with manifold melt channel 802 for receiving a melt therefrom. Particularly, the melt passes from manifold melt channel 802 through a manifold outlet 803 into nozzle melt channel 812. Nozzle melt channel 812 carries the melt through a nozzle tip 813 towards a mold gate 814 that leads to a mold cavity 816. Injection molding apparatus 800 includes heaters 815 positioned about nozzle 810 and cooling channels 817 in mold plate 809.

Figure 1:
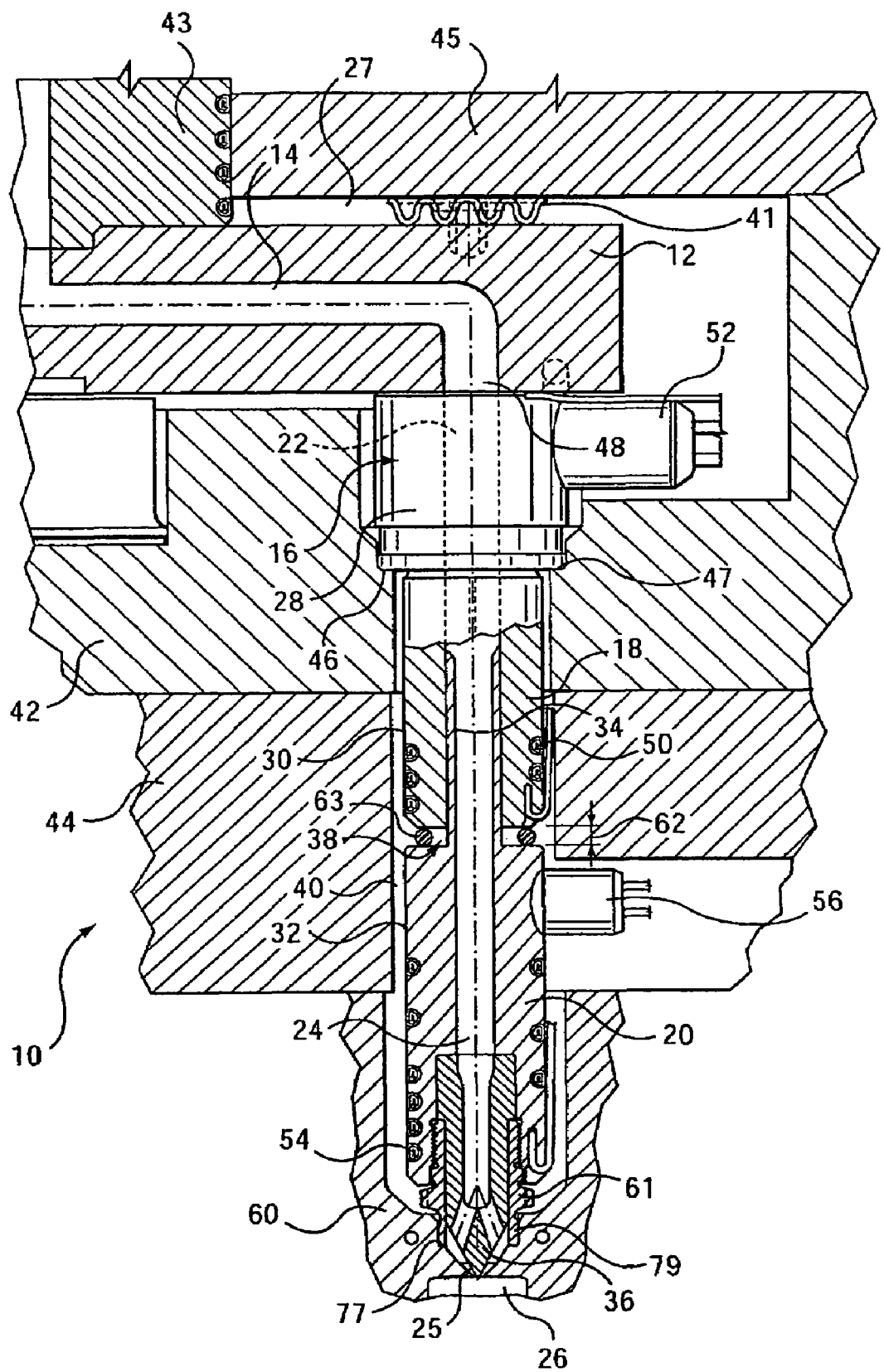
FIG. 1 is a partial cross-sectional view of a portion of an injection molding apparatus according to the present invention.

Referring now to FIG. 1, a portion of an injection molding apparatus 10 is generally shown. The injection molding apparatus 10 includes a manifold 12 having a manifold channel 14 extending therethrough. A machine nozzle (not shown) delivers a melt stream of moldable material to the manifold channel 14 via a sprue bushing 43. The manifold 12 is located between sprue bushing 43, a back plate 45, a mold plate 42 and a nozzle 16, which is coupled to an outlet 48 of the manifold 12. A disk 41 restricts movement of the manifold 12 relative to mold plate 42 and back plate 45 to axially fix the position of manifold 12. As such during operation, the manifold is effectively prevented from flexing in a direction of the back plate due to thermal expansion. An air space 27 is provided between the manifold 12 and back plate 45. When a melt stream of molten material under pressure is delivered to manifold channel 14 through sprue bushing 43, disk 41 helps to focus the force from manifold 12 directly over nozzle 16 to aid in sealing manifold 12 to first nozzle 16. Disk 41 also maintains insulating air gap 27 between manifold 12 and back plate 45. Generally this disk is designed to provide minimum contact between manifold 12 and back plate 45 and is capable of flexing to absorb some of the forces therebetween.

The nozzle 16 is disposed in an opening 40, which extends through mold plate 42 and a cavity plate 44. Only one nozzle is shown for simplicity, however, it will be appreciated that in a typical injection molding apparatus a plurality of nozzles are generally connected to a single manifold.

The nozzle 16 is generally a collapsible nozzle having a first nozzle portion 18 and a second nozzle portion 20 disposed in series between the manifold 12 and a mold cavity 26. The first nozzle portion 18 includes a first nozzle channel 22 that is aligned with the manifold outlet 48 for receiving the melt stream of moldable material therefrom. The second nozzle portion 20 similarly includes a second nozzle channel 24 for receiving the melt stream from the first nozzle channel 22 and delivering the melt stream through a mold gate 25 to a mold cavity 26.

The first nozzle portion 18 includes a nozzle head 28, which is located adjacent the manifold outlet 48, and a second end 30. A flange 46 is provided on nozzle head 28 to seat in a corresponding shoulder 47 of mold plate 42 in order to maintain first nozzle portion 18 in abutment with manifold 12. The second nozzle portion 20 includes a first end 32, which has an extended portion 34 projecting therefrom, and a nozzle tip 36, which is located at an opposite end thereof.

The first nozzle portion 18 and the second nozzle portion 20 are coupled to one another by a telescoping connection 38 in which the extended portion 34 is slidably received in the nozzle channel 22 of the first nozzle portion 18. The diameter of the first nozzle channel 22 is slightly larger than the diameter of the second nozzle channel 24 to account for the extended portion 34 being received therein. In order to avoid a change in melt pressure between the first nozzle channel 22 and the second nozzle channel 24, the diameter of the second nozzle channel 24 is sized as close to the diameter of the first nozzle channel 22 as possible.

A biasing means 63, such as a collapsible O-ring made of steel, a coiled spring or a bevel washer, surrounds extended portion 34 in a gap 62 between first and second nozzle portions 18, 20. Biasing means 63 is provided between first and second nozzle portions 18, 20 to maintain contact between first nozzle portion 18 and manifold 12 and between second nozzle portion 20 and mold gate 25, to thereby provide a preload in cold conditions. In this manner, biasing means 63 also accommodates for manufacturing tolerances. During operation, biasing means 63 absorbs the thermal expansion of first and second nozzle portions 18, 20 while counteracting injection pressures to maintain nozzle tip 36 of second nozzle portion 20 in fluid connection with mold gate 25.

Figure 10:
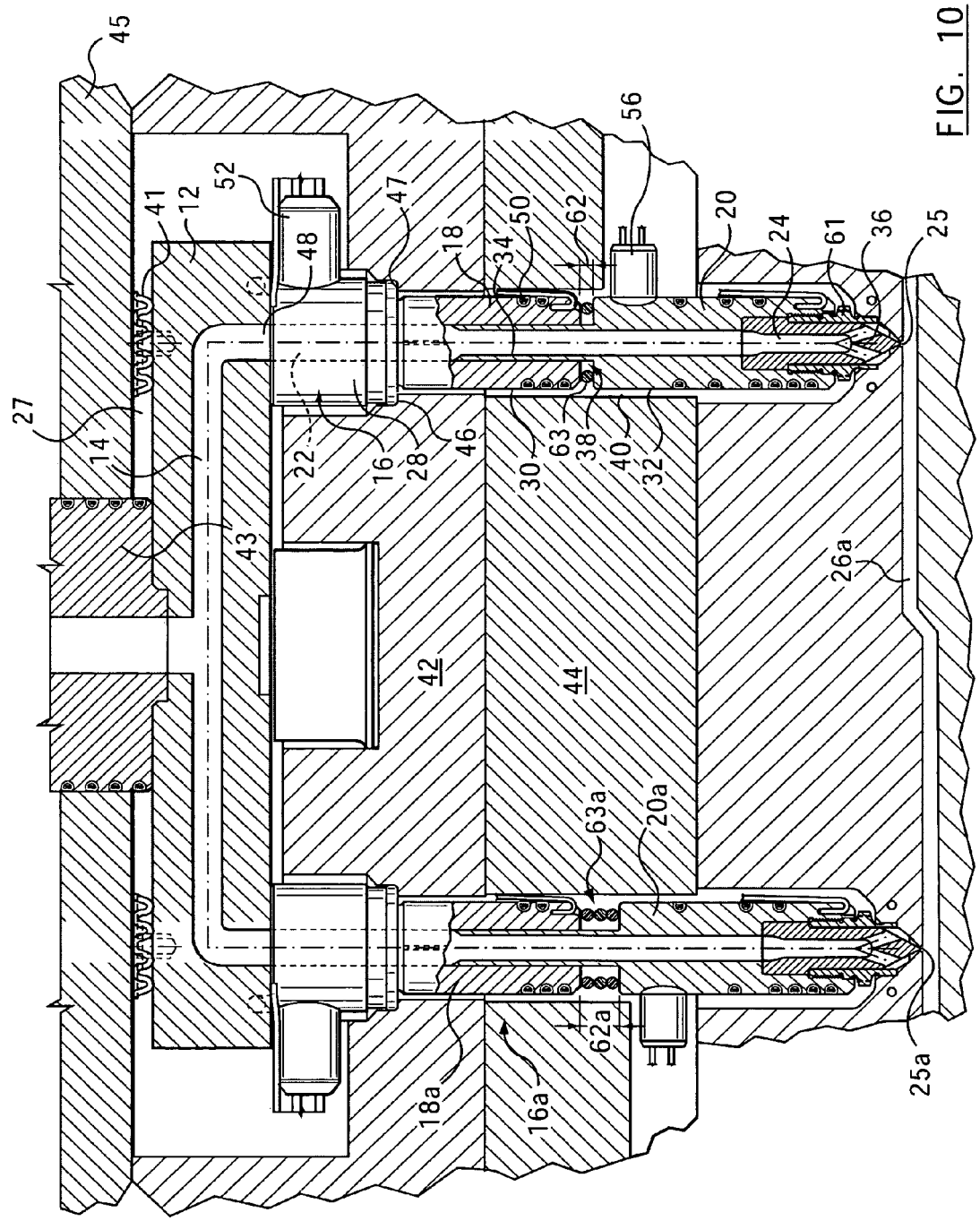
FIG. 10 is a partial cross-sectional view of a portion of an injection molding apparatus according to another embodiment of the present invention.

In another embodiment of the present invention as shown in FIG. 10, at least two nozzles 16, 16a feed a common mold cavity 26a. Lengthy mold cavities having longitudinally offset portions, such as mold cavity 26a, are commonly used in automotive applications for bumpers, dashboards, and the like. In this embodiment of the present invention, a biasing means 63a is added to nozzle 16a to increase a gap 62a between a first nozzle portion 18a and a second nozzle portion 20a. In this manner, the overall length of nozzle 16a is increased so that it meets a mold gate 25a of the longitudinally offset portion of lengthy mold cavity 26a.

The first nozzle portion 18 further includes a nozzle heater 50, which is coupled thereto. The nozzle heater 50 is in communication with a power source (not shown) through an electrical connector 52. Similarly, the second nozzle portion 20 includes a nozzle heater 54, which is in communication with a power source (not shown) through an electrical connector 56.

The manifold 12 is fixed in position within the injection molding apparatus 10 by sprue bushing 43, back plate 45 and pressure disk 41 on one surface and by nozzle 16 on an opposing surface. More particularly, head portion 28 of first nozzle portion 18 includes flange portion 46 that is seated in a corresponding shoulder 47 of mold plate 42. This arrangement sealingly maintains head portion 28 in contact with manifold outlet 48 and prevents manifold 12 from movement in the axial direction toward mold gate 25. Accordingly, although manifold 12 may deflect slightly due to thermal expansion thereof, axial movement of manifold 12 is restricted.

The injection molding apparatus of the present invention also limits axial movement of nozzle tip 36 of second nozzle portion 20 in the axial direction toward mold gate 25. In the present invention, a nozzle tip seal 61 is threadably coupled to second nozzle portion 20 to retain nozzle tip 36 thereto. A forward end 79 of nozzle tip seal 61 seats in a shoulder 77 of a mold plate 60 to restrict axial movement of nozzle tip 36 toward mold gate 25. Therefore, the axially "fixed" manifold and the restricted movement of the nozzle tip toward the mold gate results in the distance between back plate 45 and mold gate 25 being generally constant under both cold and hot conditions.

In operation, the injection molding apparatus 10 begins in a cold condition, in which the components of the injection molding apparatus 10 are in a non-expanded state. In this condition, biasing means 63 in gap 62 between second end 30 of first nozzle portion 18 and first end 32 of second nozzle portion 20 is in a preloaded condition and maintains nozzle 16 in contact with manifold 12 and mold gate 25. The injection molding apparatus 10 is then heated to an operating temperature. This causes manifold 12 and nozzle 16, including first nozzle portion 18 and second nozzle portion 20, to expand. Because axial thermal expansion of the manifold 12 and nozzle 16 is restricted by back plate 45 and mold gate 25, telescoping connection 38 takes up any axial thermal expansion that occurs. Accordingly, the size of gap 62 is reduced as extended portion 34 moves further into nozzle channel 22 of first nozzle portion 18. However, biasing means 63 prevents telescoping connection 38 between first and second nozzle portions 18, 20 from consuming gap 62.

Under operating condition, first nozzle channel 22 and second nozzle channel 24 maintain a continuous path for receiving the melt stream from the manifold channel 14 of the manifold 12. The melt then flows from the nozzle channels 22, 24 past mold gate 25 and into mold cavity 26. Once the injection portion of the cycle is complete, the molded parts are cooled and ejected from the mold cavities. Biasing means 63 then assists in returning first and second nozzle portions 18, 20 to their preloaded positions.

Telescoping connection 38 in conjunction with biasing means 63 of the nozzle 16 accommodates the slight variation in length of each nozzle in an injection molding apparatus 10 that is caused by thermal expansion. This compensates for the different conditions experienced by nozzles that are located at different positions on the manifold 12 and results in improved and consistent operation throughout the system.

Figure 9:
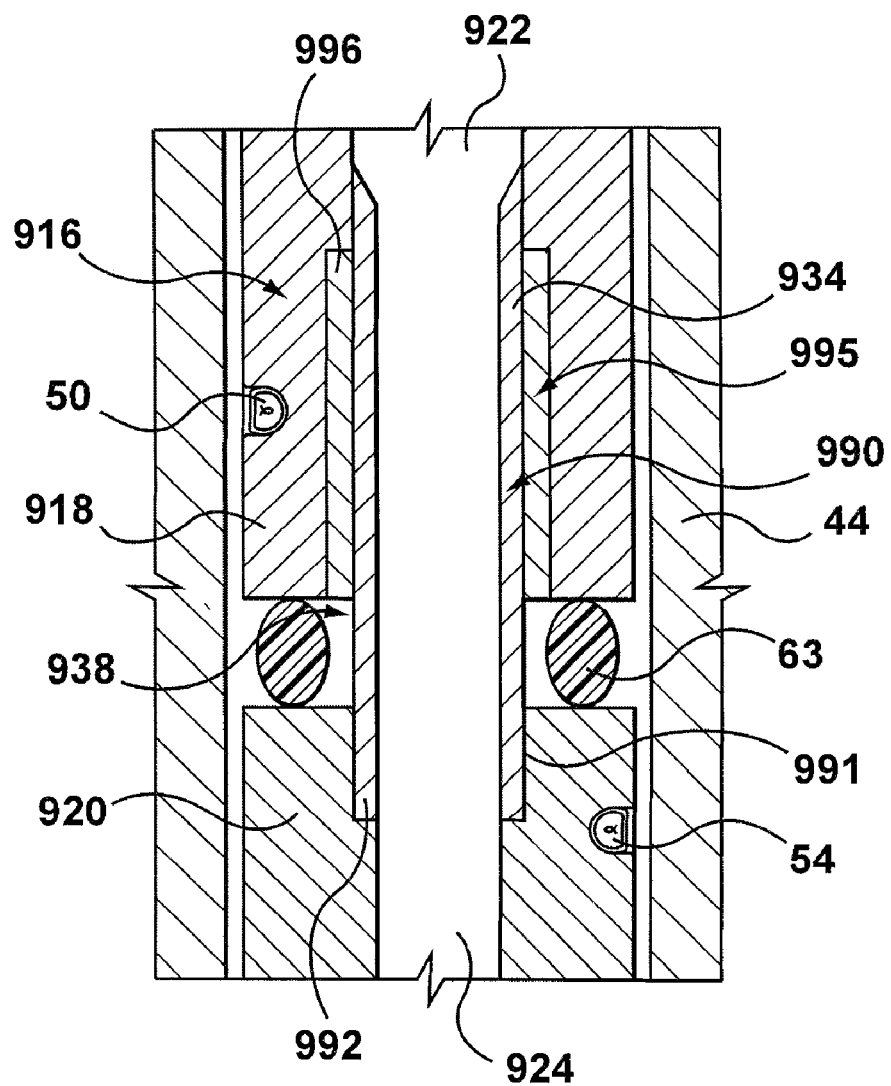
FIG. 9 is a partial cross-sectional view of a portion of an injection molding apparatus according to another embodiment of the present invention.

It will be appreciated by a person skilled in the art that the telescoping connection could be reversed. In this arrangement, the extended portion projects from the first nozzle portion and is received into the nozzle channel of the second nozzle portion. Another embodiment of a nozzle connection 938 of a portion of a nozzle 916 is shown in FIG. 9. In this embodiment a first end 991 of a telescoping connection 990 may be brazed, threaded or soldered within an annular recess 992 of a second nozzle portion 920 with an extended portion 934 slidingly received within a first nozzle channel 922 of a first nozzle portion 918. In this embodiment a sleeve 995 is positioned within an annular recess 996 of first nozzle portion 918 and may be brazed, threaded or soldered therein. Sleeve 995 is made of a material with a higher coefficient of thermal expansion than nozzle 916 and telescoping connection 990, such that telescoping connection 990 may be made of a durable wear-resistant material. As such, sleeve 995 will readily expand during operation to seal around extended postion 934 of telescoping connection 990. In another embodiment, sleeve 995 is not used and telescoping connection 990 is made of a material with a higher coefficient of thermal expansion than nozzle 916 so that it provides a sealing effect in telescoping connection 938.

Figure 2:
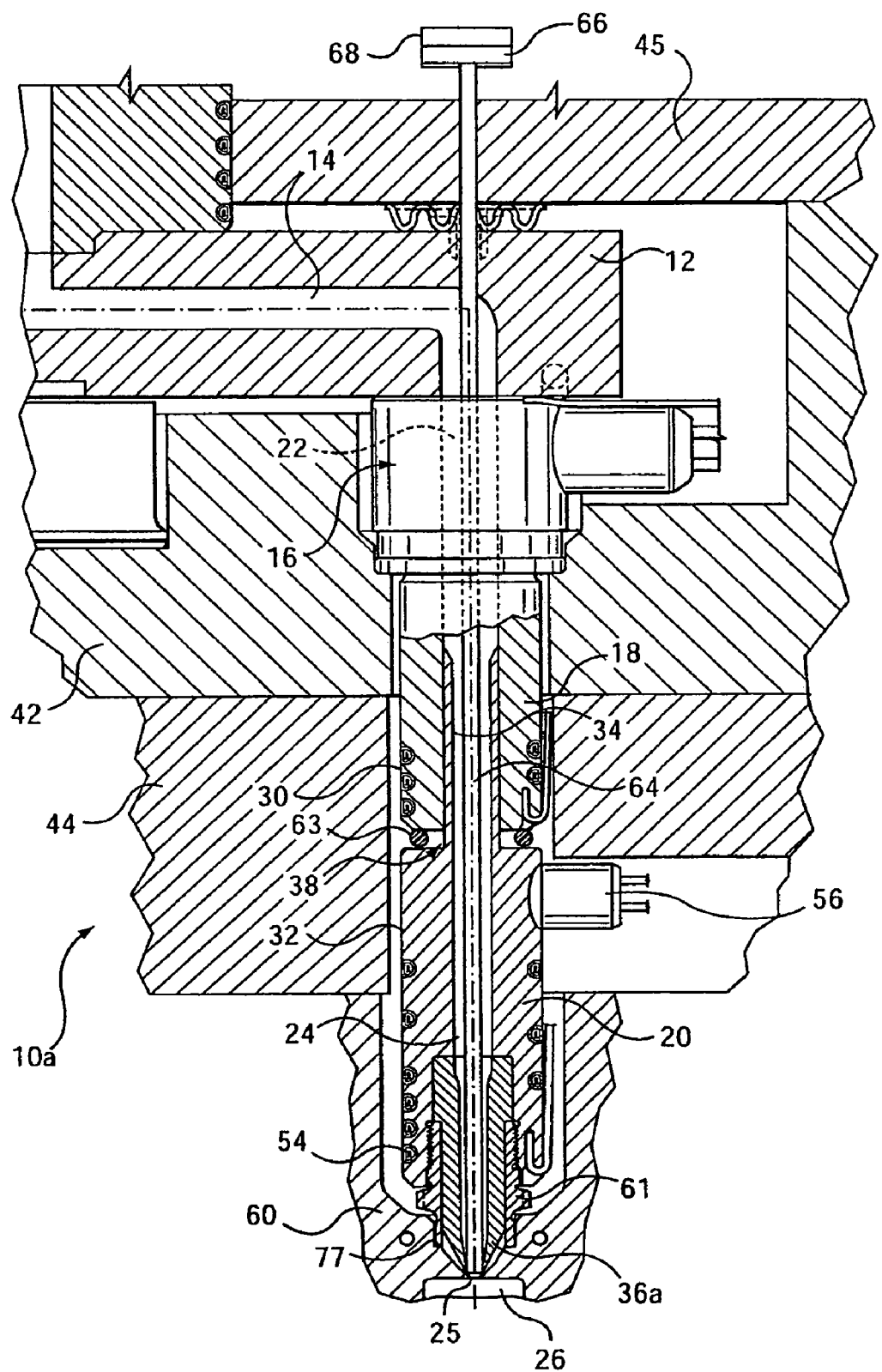
FIG. 2 is a partial cross-sectional view of a portion of an injection molding apparatus according to another embodiment of the present invention.

FIG. 2 shows another embodiment of an injection molding apparatus 10a. The injection molding apparatus 10a is similar to the injection molding apparatus 10 of FIG. 1, however, it includes a valve-gated nozzle. The second nozzle channel 24 of the second nozzle portion 20 extends axially through a nozzle tip 36a. A valve pin 64 extends through the length of the first nozzle channel 22 and the second nozzle channel 24 to selectively engage the mold gate 25. The valve pin 64 is driven by a piston 66, which is movable within a cylinder 68. The injection molding apparatus 10a operates in a similar manner as the injection molding apparatus 10, which has been previously described.

Figure 3:
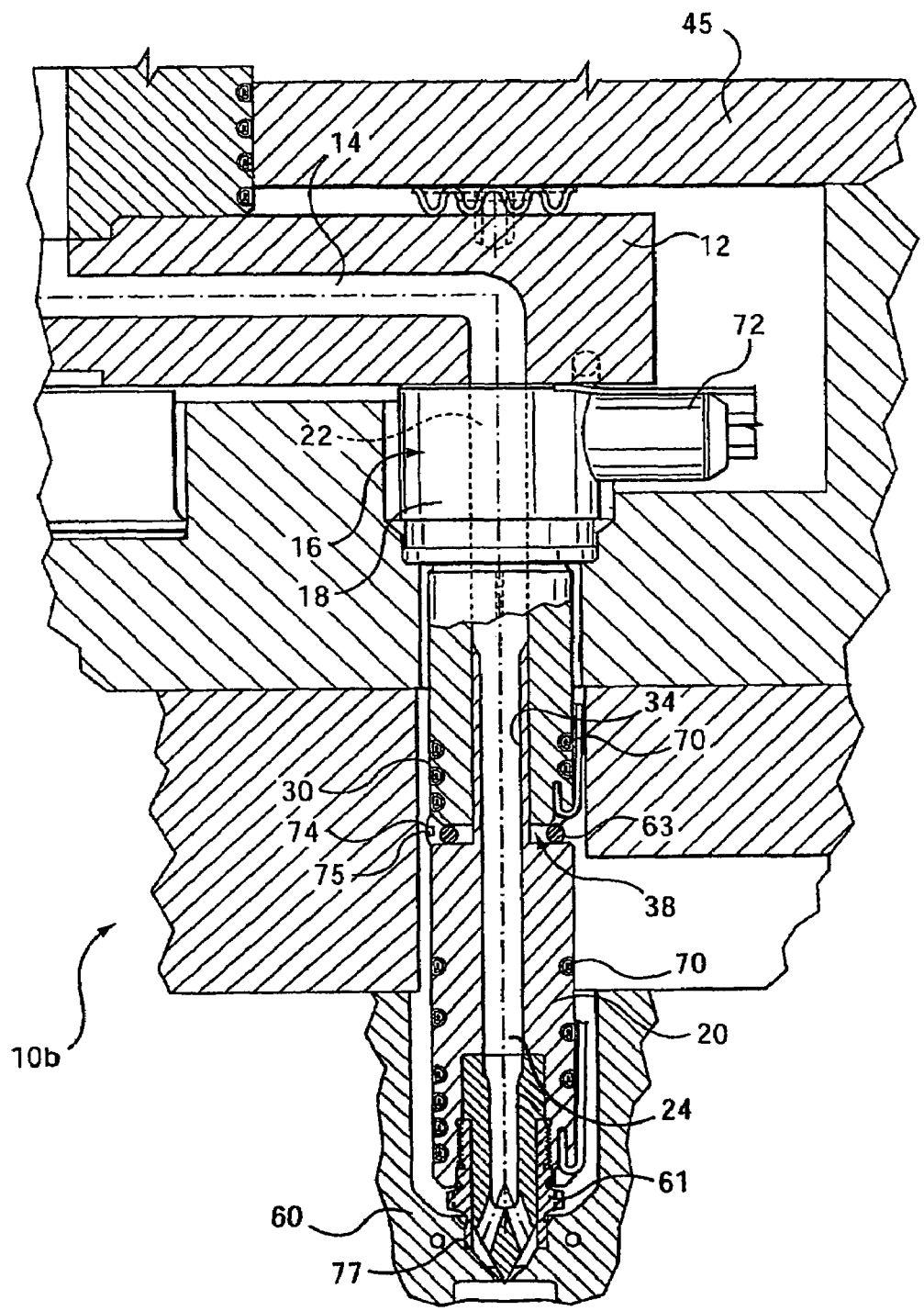
FIG. 3 is a partial cross-sectional view of a portion of an injection molding apparatus according to another embodiment of the present invention.

FIG. 3 shows another embodiment of an injection molding apparatus 10b. The injection molding apparatus 10b is similar to the injection molding apparatus 10 of FIG. 1, however, the first nozzle portion 18 and the second nozzle portion 20 are heated by a single heater 70. The heater 70 is in communication with a power source (not shown) through an electrical connector 72. The heater 70 includes an electrical link 74 having an electrical connector 75 that is provided between the first nozzle portion 18 and the second nozzle portion 20. Electrical connector 75 allows electrical link 74 to be connected and unconnected for ease of removal of second nozzle portion 20.

Figure 4:
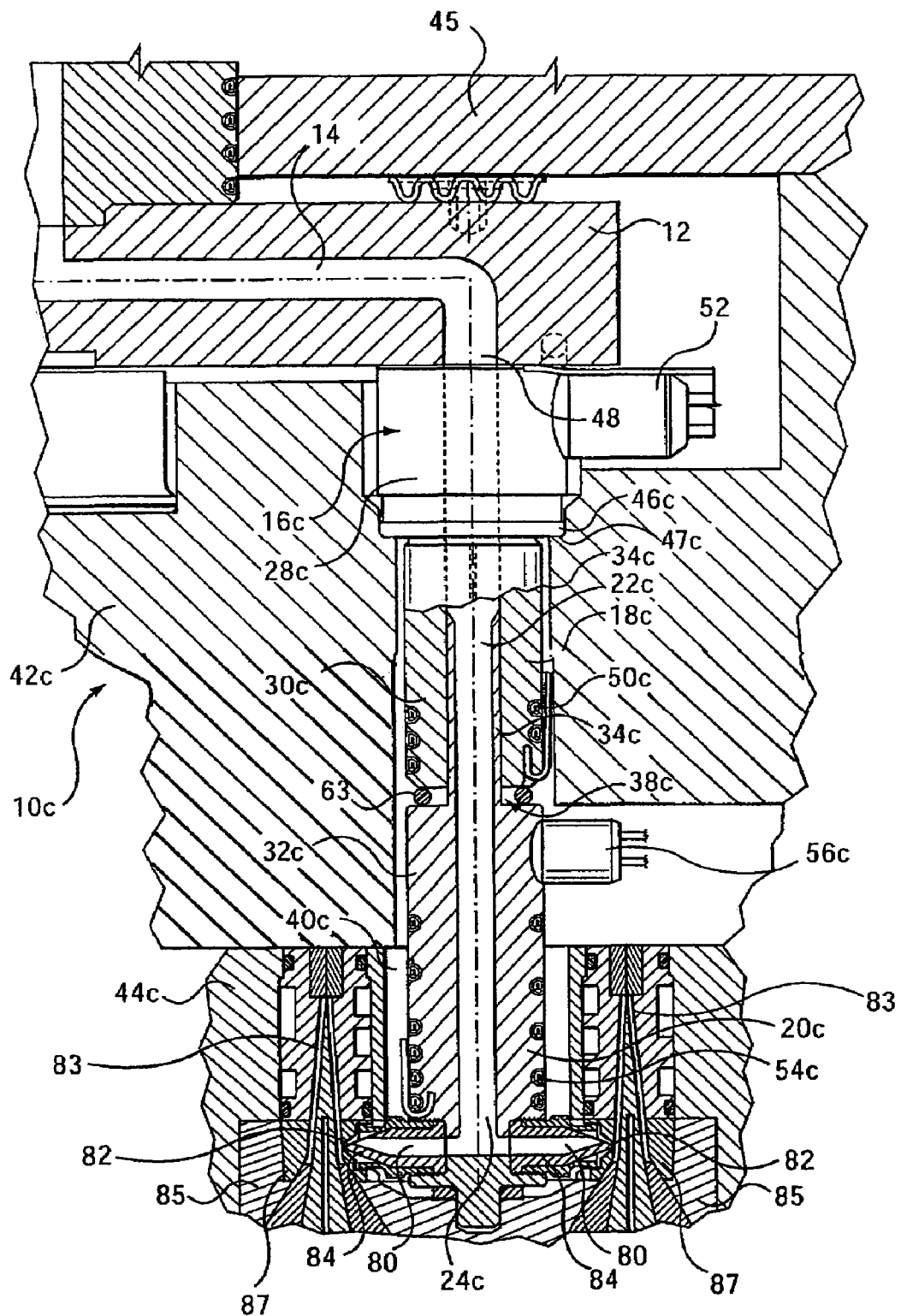
FIG. 4 is a partial cross-sectional view of a portion of an injection molding apparatus according to another embodiment of the present invention.

Referring to FIG. 4, an edge-gated injection molding apparatus is generally indicated by reference numeral 10c.

The injection molding apparatus 10c includes manifold 12 having manifold channel 14. A machine nozzle (not shown) delivers a melt stream of moldable material under pressure to the manifold channel 14 of the manifold 12 through sprue bushing 43.

A nozzle 16c is coupled to the manifold 12. The nozzle 16c is disposed in an opening 40c, which extends through a mold plate 42c and a cavity plate 44c. The nozzle 16c includes a first nozzle portion 18c and a second nozzle portion 20c. The first nozzle portion 18c includes a nozzle head 28c, which is located adjacent a manifold outlet 48c, and a second end 30c. A first nozzle channel 22c extends through the first nozzle portion 18c and is aligned with the manifold outlet 48 to receive the melt stream from the manifold channel 14. A flange 46c is provided on nozzle head 28c and sits in a corresponding shoulder 47c of mold plate 42c in order to maintain the first nozzle portion 18c in abutment with the manifold 12c.

The second nozzle portion 20c includes a second nozzle channel 24c, which is aligned with the nozzle channel 22c of the first nozzle portion 18c for receiving melt therefrom. Melt passages 80 laterally extend from the second nozzle channel 24c to deliver melt through gates 82 to a series of mold cavities 83. Gate seals 84 threadably engage second nozzle portion 20c to deliver melt from melt passages 80 to mold cavities 83. The structure surrounding each gate seal 84 includes a gate insert 85 and a gate insert retainer 53. Such an arrangement is shown and described in U.S. Pat. No. 5,536,195 to Gellert which is incorporated by reference herein in its entirety.

The first nozzle portion 18c further includes a nozzle heater 50c, which is coupled thereto. The nozzle heater 50c is in communication with a power source (not shown) through an electrical connector 52c. Similarly, the second nozzle portion 20c includes a nozzle heater 54c, which is in communication with a power source (not shown) through an electrical connector 56c.

An extended portion 34c projects from a first end 32c of the second nozzle portion 20c and includes a biasing means 63 as described above. The first nozzle portion 18c and the second nozzle portion 20c are coupled to one another by a telescoping connection 38c in which the extended portion 34c is slidably received in the nozzle channel 22c of the first nozzle portion 18c. In operation, the telescoping connection 38c accommodates the thermal expansion of the nozzle 16c and the manifold 12c, as has been previously described above with reference to the embodiment of FIG. 1.

Figures 5, 6:
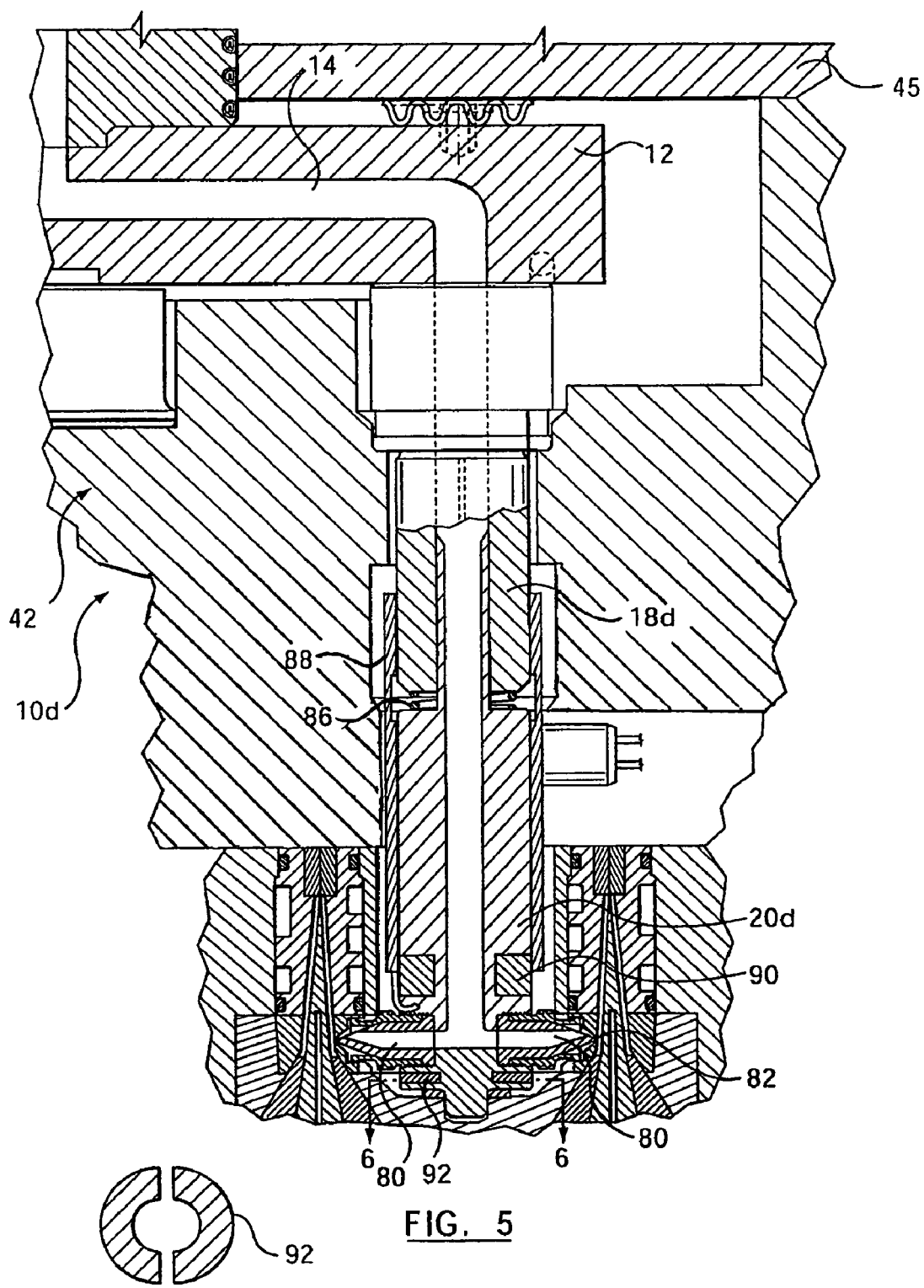
FIG. 5 is a partial cross-sectional view of a portion of an injection molding apparatus according to another embodiment of the present invention.
FIG. 6 is a cross-sectional view taken along line 6—6 of FIG. 5.

FIG. 5 shows another edge-gating embodiment of the present invention similar to that shown in FIG. 4. In this embodiment, an injection molding apparatus 10d includes a biasing means 86 that is a bevel washer. Biasing means 86 is located between first nozzle portion 18d and second nozzle portion 20d to provide a fluid-tight seal between the two nozzle portions, as well as to provide the benefits described above with reference to biasing means 63. Further, the first and second nozzle portions 18d and 20d are heated by a single removable band heater 88. A first thermally conductive ring 90 and a second thermally conductive ring 92 contribute to transferring heat from band heater 88 to the melt passages 80, as well as a lower portion of second nozzle melt channel 24, to improve the heat profile of a melt therein.

As shown in FIG. 6, second thermally conductive ring 92 may be made as a two-piece, semicircular structure that can be brazed or pressed fit into appropriate locations along second nozzle portion 20d. First thermally conductive ring 90 may be similarly made as a two-piece structure.

Figure 7A:
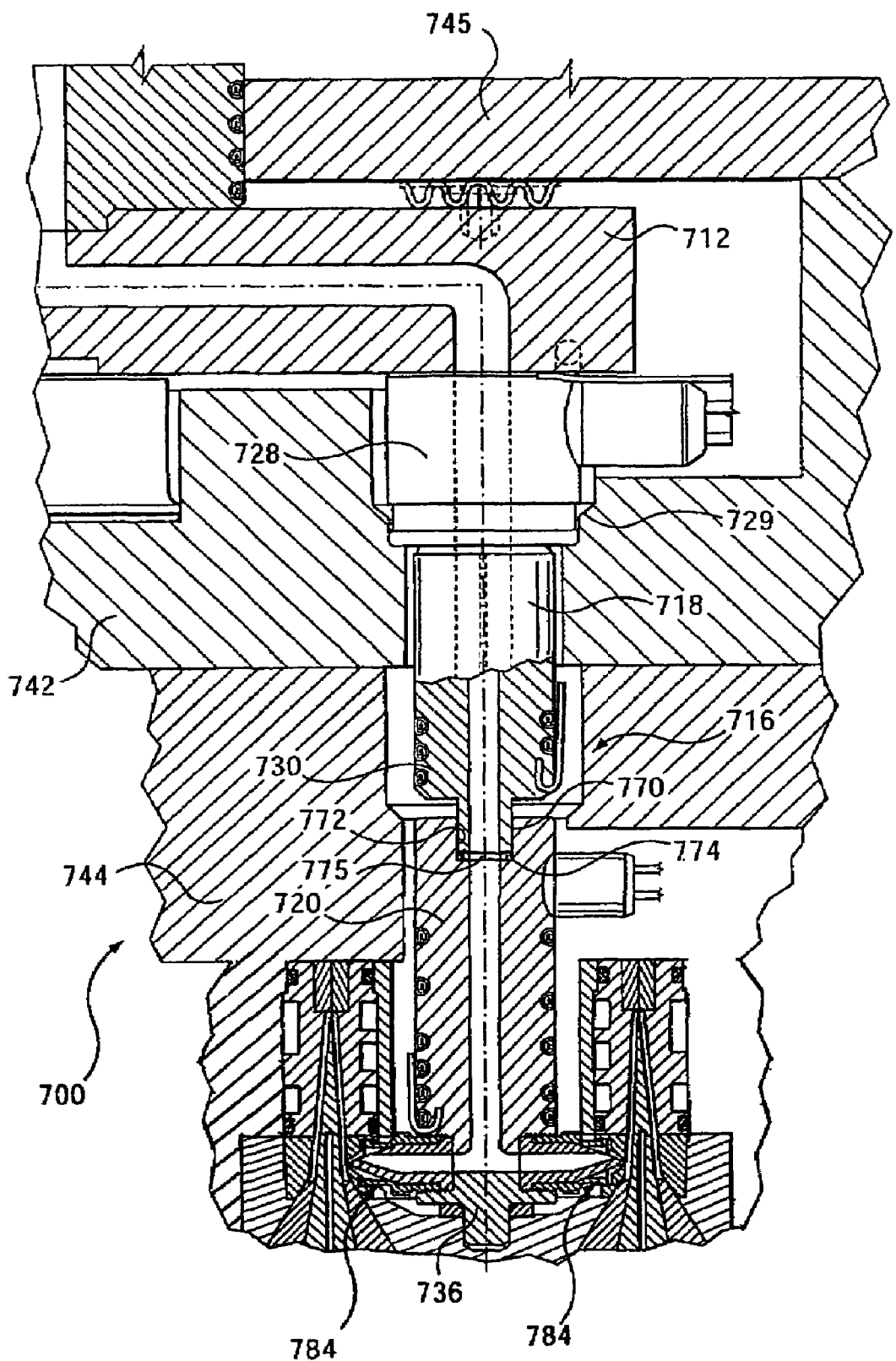
FIGS. 7A and 7B are partial cross-sectional views of a portion of an injection molding apparatus according to another embodiment of the present invention.
Figure 7B:
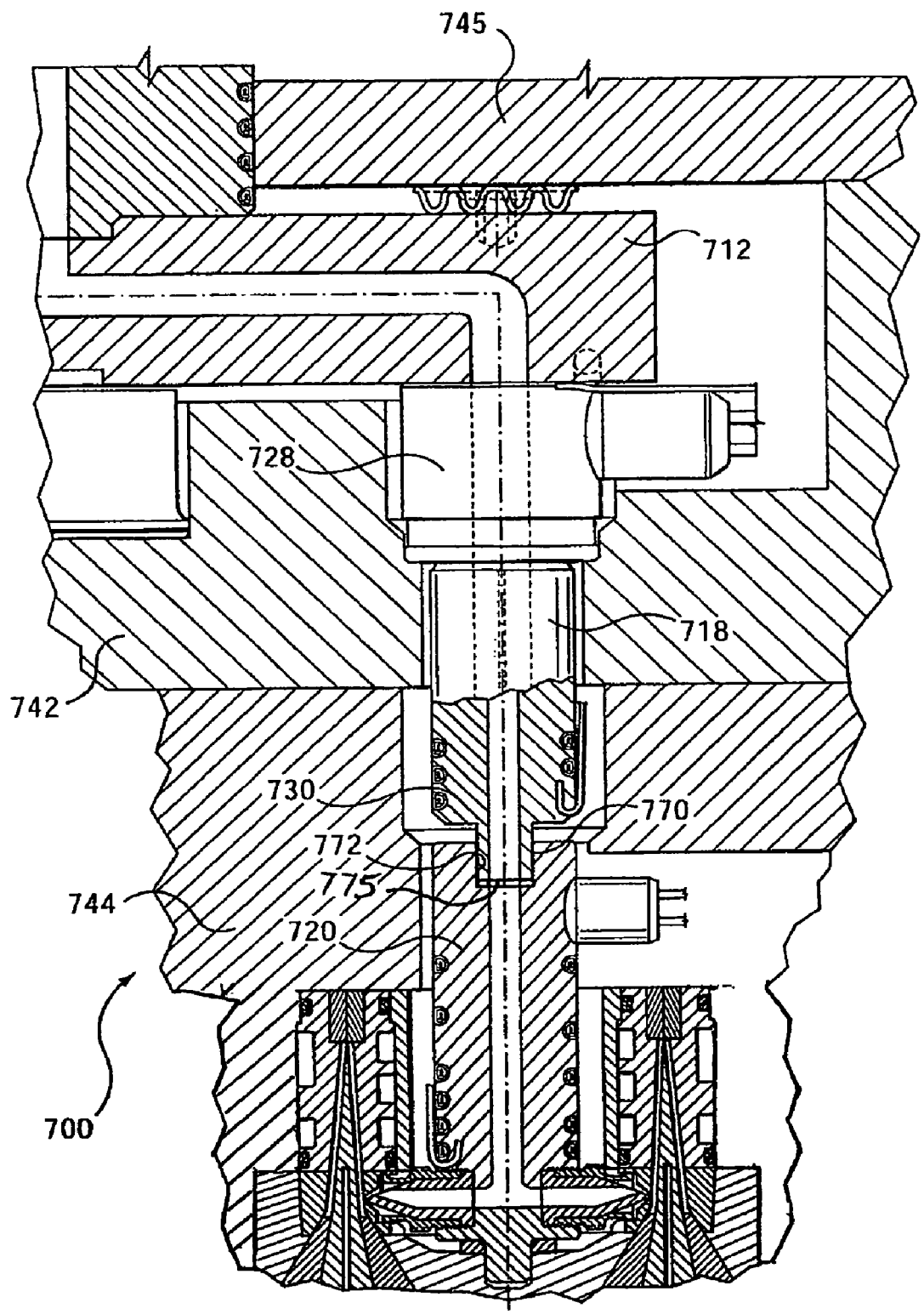

FIGS. 7A and 7B illustrate another embodiment of the present invention for use in an edge-gating injection molding system 700. A manifold 712 is fluidly connected to a nozzle 716 to deliver a melt stream thereto. Manifold 712 is relatively axially fixed in position between a back plate 745 and a head portion 728 of nozzle 716. Manifold 712 is axially fixed due to nozzle head portion 728 being seated in a shoulder 729 of a mold plate 742. Correspondingly, an edge gating tip portion 736 of nozzle 716 having gate seals 784 is axially fixed within a cavity plate 744, as discussed above with reference to the embodiment of FIG. 4.

In this embodiment of the present invention, rather than an extended portion 34c as shown in FIG. 4, an outer surface 770 of a forward end 730 of a first nozzle portion 718 seats in an aperture 772 of a second nozzle portion 720 with a gap 775 being left to accommodate for thermal expansion of the first and second nozzle portions.

In the embodiment of FIG. 7A, an O-ring 774 is used for sealing purposes to prevent melt from leaking about the intersecting region of the two nozzles. However, as is evident from the embodiment shown in FIG. 7B, the first nozzle portion 718 can be made to be seated within the aperture 772 of the second nozzle portion 720 without additional sealing means, wherein axial and radial thermal expansion at the intersecting region of the first and second nozzle portions 718, 720 creates a sealing effect.

In operation, thermal expansion of edge-gating injection molding system 700 is accommodated by nozzle 716, such that manifold 712 and gate seals 784 remain substantially axially fixed in location. More particularly as nozzle 716 heats-up and thermally expands, first nozzle portion 718 and second nozzle portion 720 slide relative to each other to reduce or substantially consume gap 775.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus comprising:
   a manifold having a manifold channel for receiving a melt stream of moldable material under pressure;
   a nozzle having a first nozzle portion and a second nozzle portion provided in series between said manifold and a mold gate, said first nozzle portion and said second nozzle portion having respective nozzle melt channels for delivering the melt stream from said manifold to a mold cavity;
   a nozzle tip attached to a forward end of said second nozzle portion for delivering the melt stream to the mold cavity; and
   a telescoping connection provided between said first nozzle portion and said second nozzle portion to allow for a continuous flow of melt therebetween, said telescoping connection including an extended portion integral with one of said first and second nozzle portions that is slidable within the other of said first and second nozzle portions;
   wherein thermal expansion during operation of said injection molding apparatus is absorbed by said telescoping connection.

2. The injection molding apparatus of claim 1, wherein a nozzle heater is coupled to said nozzle to heat said first nozzle portion and said second nozzle portion.

3. The injection molding apparatus of claim 1, wherein a first nozzle heater is coupled to said first nozzle portion and a second nozzle heater is coupled to said second nozzle portion.

4. An injection molding apparatus comprising:
   an injection manifold having a melt channel;
   at least one injection nozzle having a nozzle head portion, a nozzle flange, a first nozzle body portion including a first nozzle melt channel in communication with said manifold melt channel, and a second nozzle body portion, said second nozzle body portion having a second nozzle melt channel located along the same axis as said first nozzle melt channel;
   a nozzle connection located between said first nozzle body portion and said second nozzle body portion, said nozzle connection having a connection melt channel and a wall section surrounding said connection melt channel, whereby said wall section is slidable within one of said first and second nozzle melt channels; and
   a nozzle tip attached to said second nozzle body portion, said nozzle tip having a nozzle tip melt channel in communication with said second nozzle melt channel and a mold gate.

5. The injection molding apparatus according to claim 4, wherein said nozzle flange locates and retains said nozzle head portion in a mold plate bore that surrounds said injection nozzle.

6. The injection molding apparatus according to claim 4, wherein said first nozzle body portion is heated by a first heater and said second nozzle body portion is heated by an independent second heater.

7. The injection molding apparatus according to claim 6, wherein said first and second heaters are embedded at least partially in said first and second nozzle body portions.

8. The injection molding apparatus according to claim 4, wherein a single heater is located along said first and second nozzle body portions.

9. The injection molding apparatus according to claim 1, further comprising a biasing means surrounding said telescoping connection.

10. The injection molding apparatus according to claim 4, further comprising a biasing means surrounding said nozzle connection.

11. The injection molding apparatus according to claim 4, wherein at least two nozzles are coupled to said manifold and are positioned in communication with at least two mold gates of a single mold cavity.

12. The injection molding apparatus according to claim 11, wherein said mold cavity has a longitudinally offset portion and each of said nozzles has a different length.

13. The injection molding apparatus according to claim 4, wherein a first end of said wall section of said nozzle connection is fixedly attached to said second nozzle body portion such that a second end of said wall section is slidable within said first nozzle melt channel.

14. The injection molding apparatus according to claim 4, wherein said nozzle connection includes an annular sleeve portion positioned within a recess of said first nozzle body portion and said wall section of said nozzle connection is a telescoping connection having a first end secured within a recess of said second nozzle body portion and an extended portion end that is slidable within at least said sleeve portion.

15. The injection molding apparatus according to claim 14, wherein said sleeve portion and said telescoping connection are made of two different materials and each material has a different coefficient of thermal expansion.

16. The injection molding apparatus of claim 1, wherein said extended portion is integral with said second nozzle portion and is slidable within said nozzle melt channel of said first nozzle portion.

17. The injection molding apparatus of claim 1, wherein said extended portion is integral with said first nozzle portion and is slidable within an aperture of said second nozzle portion.

18. The injection molding apparatus of claim 1, wherein said nozzle has a plurality of nozzle tips having melt passages that radially extend from said nozzle melt channel of said second nozzle portion, wherein each of said nozzle tips delivers the melt stream from said nozzle melt channel of said second nozzle portion to a respective mold gate.

19. The injection molding apparatus of claim 4, wherein said nozzle includes a plurality of nozzle tips having melt passages that radially extend from said second nozzle melt channel, wherein each of said nozzle tips delivers the melt stream from said second nozzle melt channel to a respective mold gate.

20. An injection molding apparatus comprising:
a manifold having a manifold channel for receiving a melt stream of moldable material;
a nozzle having a first nozzle body and a second nozzle body, said first nozzle body having a first nozzle body melt channel for receiving the melt stream from said manifold melt channel and said second nozzle body having a second nozzle body melt channel for receiving the melt stream from the first nozzle body melt channel; and
a nozzle tip attached to said second nozzle body, said nozzle tip having a nozzle tip melt channel in communication with said second nozzle body melt channel and a mold gate of a mold cavity,
wherein said first nozzle body includes a reduced diameter downstream portion that is slidably received within an aperture in an upstream portion of said second nozzle body such that a gap exists between a forward end surface of said reduced diameter downstream portion and an opposing surface of said aperture to accommodate for thermal expansion of said first and second nozzle bodies.

21. The injection molding apparatus of claim 20, further comprising an o-ring positioned between said forward end surface of said reduced diameter downstream portion and said opposing surface of said aperture.

22. The injection molding apparatus of claim 20, wherein said nozzle includes a plurality of nozzle tips having melt passages that radially extend from said second nozzle body melt channel, wherein each of said nozzle tips delivers the melt stream from said second nozzle body melt channel to a respective mold gate.

23. The injection molding apparatus according to any one of claims 18, 19 and 22, wherein said nozzle tips are gate seals.

* * * * *